(12) United States Patent
Zhang et al.

(10) Patent No.: US 7,841,887 B2
(45) Date of Patent: Nov. 30, 2010

(54) PLUGGABLE MODULE HAVING EJECTOR DEVICE

(75) Inventors: Xue-Liang Zhang, Kunshan (CN); Qing-Man Zhu, Kunshan (CN); Chien-Chiung Wang, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 99 days.

(21) Appl. No.: 12/381,024

(22) Filed: Mar. 5, 2009

(65) Prior Publication Data

US 2009/0227133 A1  Sep. 10, 2009

(30) Foreign Application Priority Data

Mar. 5, 2008  (CN) .................. 2008 2 0032487 U

(51) Int. Cl.
*H01R 13/627* (2006.01)
(52) U.S. Cl. .................................... 439/352
(58) Field of Classification Search .............. 439/352, 439/358, 160, 152; 385/92
See application file for complete search history.

(56) References Cited

U.S. PATENT DOCUMENTS

| | | | |
|---|---|---|---|
| 6,447,170 B1 * | 9/2002 | Takahashi et al. .............. 385/53 |
| 6,744,963 B2 | 6/2004 | Hwang | |
| 6,746,264 B1 * | 6/2004 | Branch et al. ................ 439/352 |
| 7,008,253 B2 * | 3/2006 | Szczesny ..................... 439/352 |
| 7,160,135 B1 * | 1/2007 | Wu ............................ 439/352 |
| 7,281,937 B2 * | 10/2007 | Reed et al. ................... 439/352 |
| 7,736,171 B2 * | 6/2010 | Reed et al. ................... 439/352 |
| 7,771,225 B1 * | 8/2010 | Wu ............................ 439/352 |

* cited by examiner

*Primary Examiner*—Alexander Gilman
(74) *Attorney, Agent, or Firm*—Ming Chieh Chang; Wei Te Chung; Andrew C. Cheng

(57) ABSTRACT

A pluggable module (3) retained in a mating receptacle cage (1) which has a retaining tab (10) includes a housing (30) and an ejector device (34). The housing has a latch portion (310) retained in the retaining tab, a recessing portion (312) defined on a surface thereof, at least one inclined portion (314) located on the surface of the recessing portion. The ejector device includes a spring member (340) slidably received in the recessing portion and a driving portion (341) for pulling the spring member forwardly. The spring member is guided by the inclined portion and upwardly resists against the retaining tab for releasing the latch portion of the housing from the retaining tab of the receptacle cage.

18 Claims, 6 Drawing Sheets

PLUGGABLE MODULE HAVING EJECTOR DEVICE

BACKGROUND OF THE INVENTION

1. Field of the Invention

The present invention relates to a pluggable module, and particularly to pluggable module having ejector device which is used to withdraw the pluggable module from a mating receptacle cage.

2. Description of the Prior Art

A small form-factor pluggable transceiver (SFP transceiver) provides a link between an electronic transmission line and an optical transmission line as a bi-direction opto-electronic converter. U.S. Pat. No. 6,744,963 issued to Jenq-Yih Hwang on Jun. 1, 2004 discloses an EMI-minimized transceiver received in a transceiver cage. The transceiver includes a housing having a latch, an ejector mounted to a passage defined in the housing for disengaging the latch from a retaining tab of the cage, and a de-latching mechanism having a driving device and a linking rod. The driving device is rotatably attached to the upper portion of the housing and movably engaged with the ejector. Pulling the driving device to drive the ejector to slide into the housing, whereupon the latch of the housing is released from the retaining tab of the cage. However, it is complicated to assembly the de-latch mechanism to the housing of the transceiver and resulted in a high cost of the manufacture.

U.S. Pat. No. 6,083,047 issued to the same inventor Hwang discloses an SFP module including a housing and an ejector. An ejector seat is formed in the housing for receiving the ejector. A triangular latch is formed on the housing behind the ejector seat. The ejector includes a push bar exposed forward of a front end of the housing, and a tongue board. Two ejecting protrusions are formed at a rear end of the tongue board, corresponding to a spring tab of an SFP cage. The spring tab defines a retaining hole for retaining the latch of the housing. When the SFP module is withdrawn from the cage, the push bar is pressed until the protrusions of the ejector have released the spring tab from the latch of the housing. The SFP module is then ejected from the cage by conventional spring means located in a rear of the cage. However, it is inconvenient to manually push the ejecting block at that location. This is particularly so in modern systems having high port densities in and around the cage that restrict access to the ejecting block.

Hence, an improved pluggable module is needed to solve the above problem.

BRIEF SUMMARY OF THE INVENTION

Object of the present invention is to provide a pluggable module having an improved ejector device for easily releasing the pluggable module from a mating receptacle cage.

The present invention provides a pluggable module retained in a mating receptacle cage which has a retaining tab. The pluggable module comprises a housing, an ejector device and a printed circuit board mounted into the housing. The housing comprises a latch portion retained in the retaining tab, a recessing portion defined on a surface thereof, at least one inclined portion located on the surface of the recessing portion and adjacent to the latch portion. The ejector device comprises a spring member slidably received in the recessing portion and a driving portion for pulling the spring member forwardly. When the pluggable module being ejected from the receptacle cage, the spring member is guided by the inclined portion of the housing and upwardly resists against the retaining tab for releasing the latch portion of the housing from the retaining tab of the receptacle cage in order to easily withdraw the pluggable module from a mating receptacle cage. The construction of the ejector device is so simple that the cost of the manufacture has been saved.

Other objects, advantages and novel features of the invention will become more apparent from the following detailed description of the present embodiments when taken in conjunction with the accompanying drawings.

DETAILED DESCRIPTION OF THE INVENTION

Figure 1:
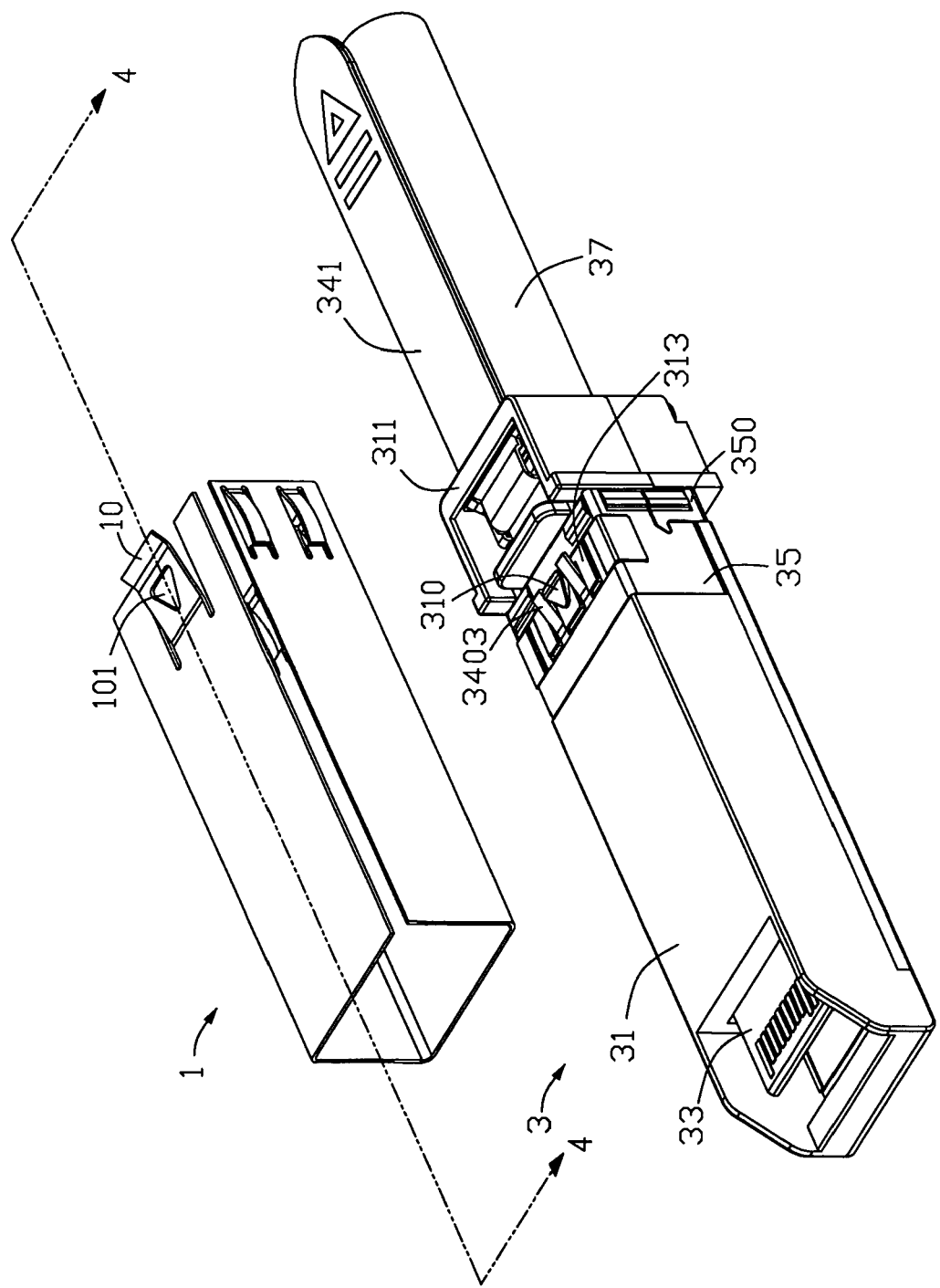
FIG. 1 is a perspective view of a pluggable module and a receptacle cage when the pluggable module being ejected from the receptacle cage.
Figure 2:
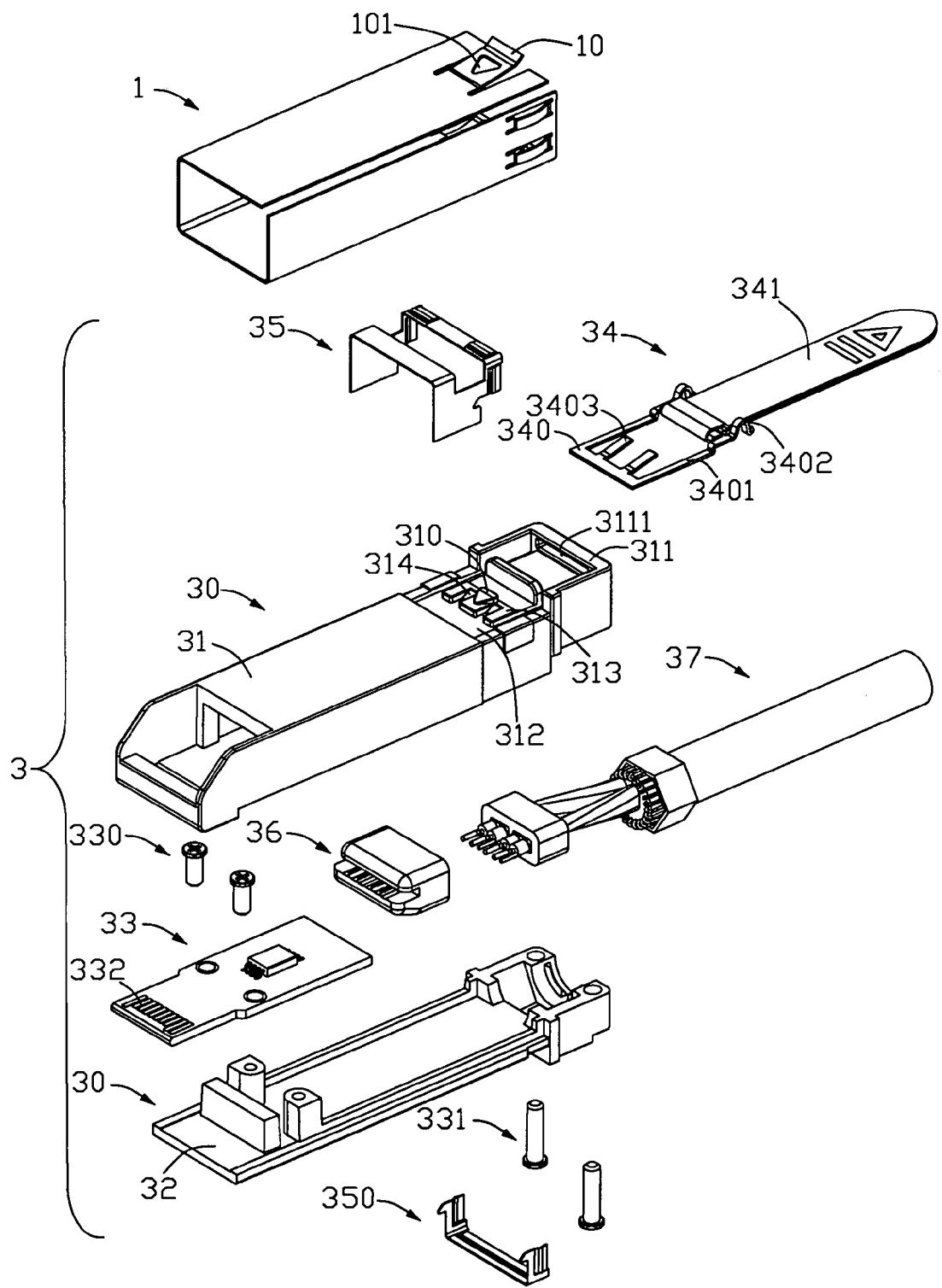
FIG. 2 is an exploded view of the pluggable module and the receptacle cage as shown in FIG. 1.

Reference will now be made to the drawing figures to describe the present invention in detail. Referring to FIGS. 1 and 2, a pluggable module 3 retained in a receptacle cage 1 has a housing 30, an ejector section 34 and a printed circuit board 33 mounted into the housing 30. The receptacle cage 1 comprises a retaining tab 10 having an aperture 101 defined thereon.

Figure 3:
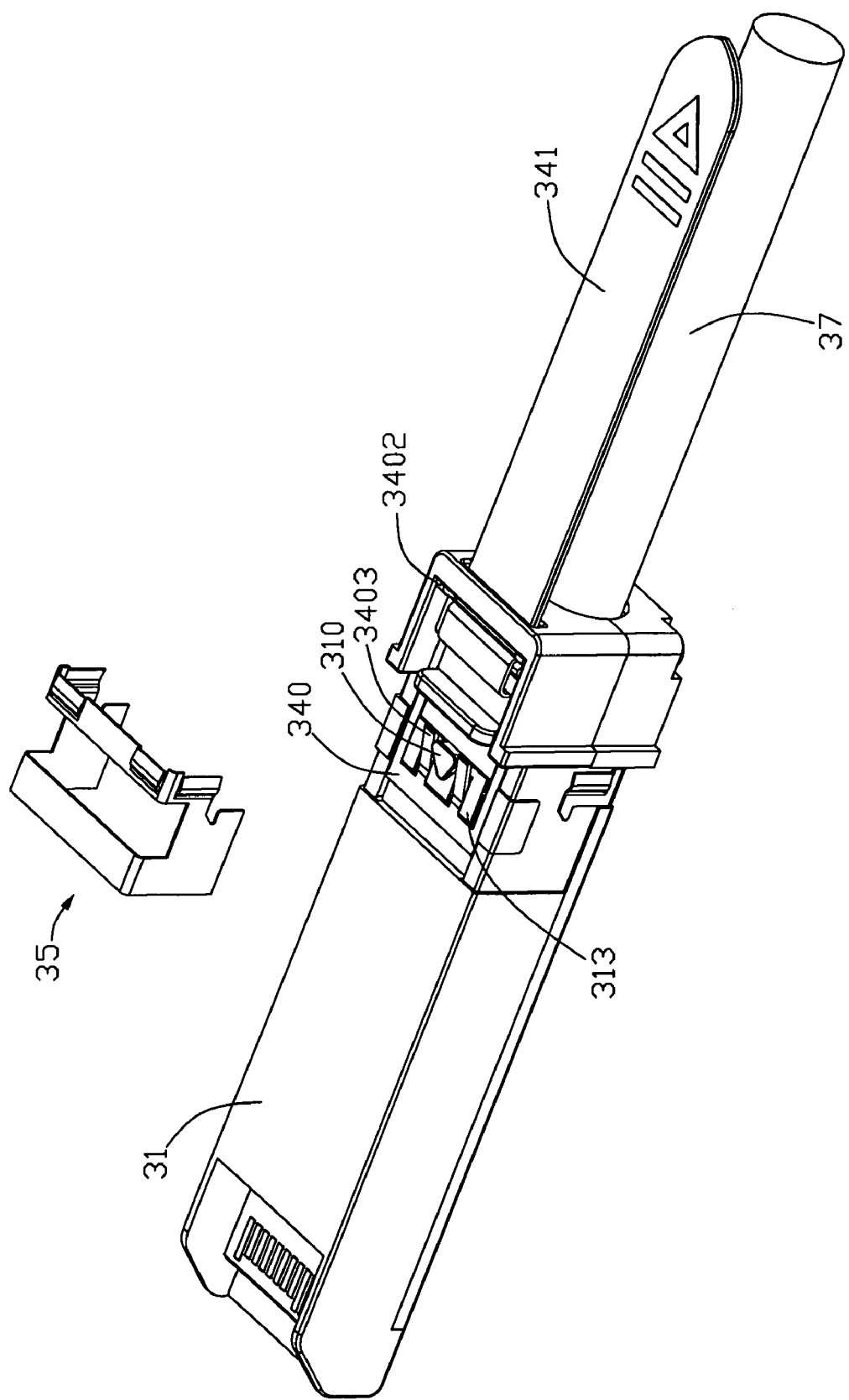
FIG. 3 is a partially assembled perspective view of the pluggable module, when a top shield is not mounted to a housing.

Referring to FIGS. 1-3, the housing 30 includes a top housing 31 and a bottom housing 32. The top housing 31 has a recessing portion 312 defined on a surface thereof, an E-shaped step 313 disposed on a surface of the recessing portion 312, a latch portion 310 formed on the E-shaped step 313 and retained in the aperture 101 of the retaining tab 10, a pair of inclined portions 314 respectively located adjacent to the latch portion 310. The top housing 31 further comprises a blocking wall 311 disposed thereon.

Referring to FIGS. 2-6, the ejector device 34 comprises a spring member 340 slidably received in the recessing portion 312 and guided by the inclined portions 314 of the housing 30 to resist against the retaining tab 10, and a driving portion 341 for pulling the spring member 340 forwardly. The spring member 340 includes a rectangular frame 3401, a pair of resisting plates 3403 extending from a side of the frame 3401 toward the corresponding inclined portions 314 of the top housing 31, and a pair of resilient portions 3402 extending forwardly from the frame 3401 and resisting against a side section of the blocking wall 311 for withdrawing the spring member 340 to an initial position. The driving portion 341 extends outwardly through a cutout 3111 defined on the side section of the blocking wall 311.

The pluggable module 3 further has a top shield 35 mounted onto the recessing portion 312 and a bottom shield 350 assembled to the bottom housing 32 and locking with the top shield 35. The spring member 340 is fixed between the top shield 35 and the surface of the recessing portion 312.

The printed circuit board 33 has a number of pads 332 disposed on a front section thereof. The pluggable module 3 comprises a connecting portion 36 mounted to a rear section of the printed circuit board 33 for electrically connecting a plurality of cables 37 to the printed circuit board 33.

Figure 4:
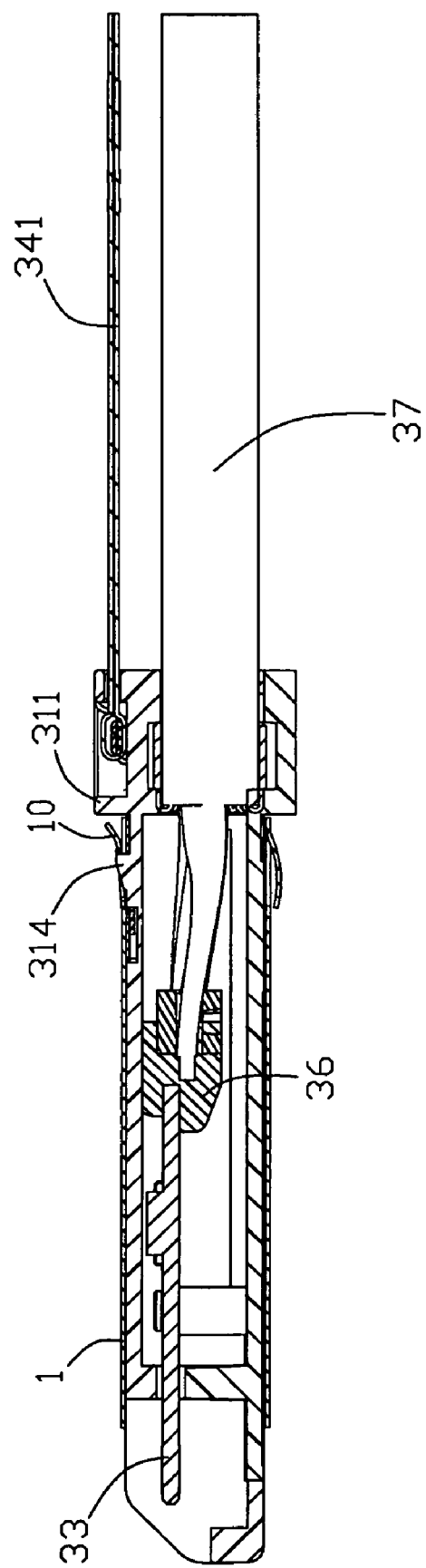
FIG. 4 is a cross sectioned view taken along line 4-4 of FIG. 1, showing a latch portion of the pluggable module released from an aperture of a retaining tab of the receptacle cage.
Figure 5:
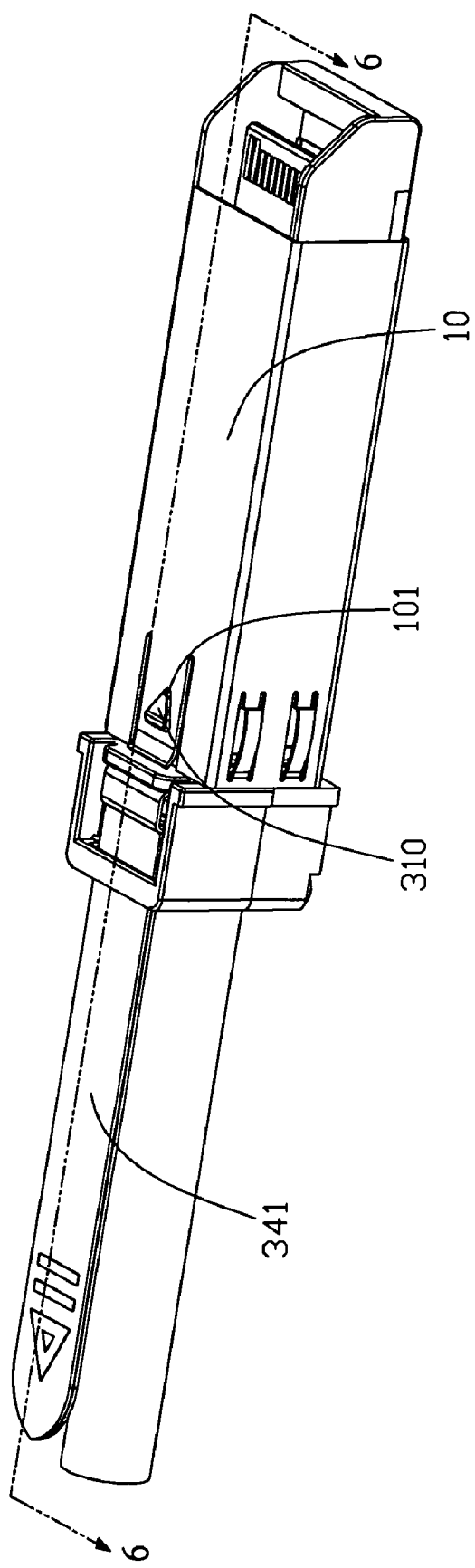
FIG. 5 is a perspective view of the pluggable module and the receptacle cage when the latch portion of the pluggable is retained in the aperture of the retaining tab.
Figure 6:
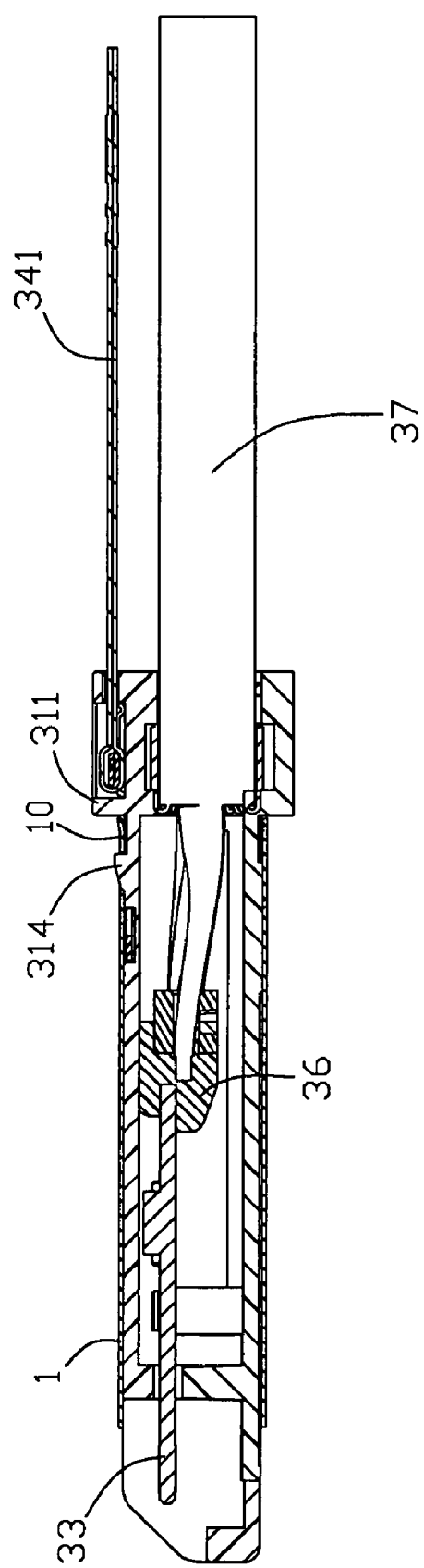
FIG. 6 is a cross sectioned view taken along line 6-6 of FIG. 5, showing a latch portion of the pluggable module released from an aperture of a retaining tab of the receptacle cage.

Referring to FIGS. 2, 4 and 6, during assembly, firstly, the connecting portion 36 is mounted to the rear portion of the printed circuit board 33 and the cables 37 are electrically connected to the connecting portion 36. Secondly, the printed circuit board 33 is mounted to the bottom housing 32 by a pair of first screws 330 inserting through the printed circuit board 33 and fixed into the bottom housing 32. The top housing 31 is assembled to the bottom housing 32 by a pair of second screws 331 inserting through the bottom housing 32 and the top housing 31. Thirdly, the spring member 340 of the ejector device 34 is received in the recessing portion 312 and the driving portion 341 extends throughout a cutout 3111 of the blocking wall 311. The top shield 35 and the bottom shield 350 are respectively mounted onto the recessing portion 312 and the bottom housing 32 and lock with each other. At this time, the latch portion 310 of the top housing 31 is retained in the aperture 101 of the retaining tab 10.

FIG. 4 schematically illustrates a process of releasing the pluggable module 3 from the receptacle cage 1. When driving portion 34 is pulled forwardly, the resisting plates 3403 are guided by the inclined portions 314 of the top housing 31 and resist against the retaining tab 10 for releasing the latch portion 310 from the aperture 101 of the retaining tab 10. The resilient portions 3402 of the ejector device 34 are compressed and resist against the blocking wall 310 of the top housing 31. When the pluggable module 3 withdraws from the receptacle cage 1, the ejector device 34 returns to its original position by a flexible force provided from the compressed resilient portions 3402.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A pluggable module retained in a mating receptacle cage with a retaining tab, comprising:
   a housing comprising a latch portion for being retained in the retaining tab, a recessing portion defined on a surface thereof, and at least one inclined portion located on the recessing portion and adjacent to the latch portion;
   an ejector device comprising a spring member slidably received in the recessing portion and a driving portion for pulling the spring member backwardly, when the pluggable module being ejected from the receptacle cage, said spring member is guided by the inclined portion of the housing and resists against the retaining tab for releasing the latch portion of the housing of the pluggable module from the retaining tab of the receptacle cage; and
   a printed circuit board mounted into the housing.

2. The pluggable module as claimed in claim 1, wherein said spring member comprises a rectangular frame, and at least one resisting plate extending from a side of the frame toward the inclined portion of the housing.

3. The pluggable module as claimed in claim 1, wherein said housing comprises a blocking wall disposed thereon, and wherein the blocking wall has a cutout defined thereon through which the driving portion of the ejector device extends outwardly.

4. The pluggable module as claimed in claim 3, wherein said spring member further comprises a resilient portion projecting outwardly and resiliently resisting against the blocking wall, and wherein the resilient portion provides an elastic force to return the spring member to an original position when the pluggable module is released from the receptacle cage.

5. The pluggable module as claimed in claim 1, wherein said housing comprises a top housing and a bottom housing, and wherein said printed circuit board is mounted between the top housing and the bottom housing.

6. The pluggable module as claimed in claim 5, further comprising a top shield mounted over the recessing portion for confining the spring member between the top shield and the surface of the recessing portion, and a bottom shield mounted to the bottom housing for locking with the top shield.

7. The pluggable module as claimed in claim 6, further comprising a pair of fasteners mounted into the bottom housing for connecting the bottom housing to the top housing.

8. The pluggable module as claimed in claim 1, further comprising a connecting portion mounted to a rear section of the printed circuit board for electrically connecting a plurality of cables to the printed circuit board.

9. A pluggable module assembly comprising:
   a metallic mating receptacle cage with a deflectable retaining tab thereon,
   a housing received in the mating receptacle cage and defining a near end region and a far end region opposite to each other, said near end region comprising a latch portion for being retained in a locking aperture of the retaining tab;
   a mating port located around the far end region for mating with a corresponding electronic part on a mother board on which the mating receptacle cage is located;
   a cable extending out of the near end region and away the far end region;
   an ejector device located around the near end region and essentially back and forth moveable with regard to the housing in a mating direction between outer and inner positions and located at a similar level with regard to the retaining tab, said ejector device including a resisting plate pushing the deflectable retaining tab outwardly in a transverse direction perpendicular to said mating direction when the ejector device is moved backwardly in an un-mating direction opposite to mating direction, and a driving portion extending along said un-mating direction away from the near end region for finger holding so as to move said ejector device backwardly in said un-mating direction toward the outer position for unlatching the latch portion from the retaining tab.

10. The pluggable module assembly as claimed in claim 9, wherein said ejector device is further equipped with a spring structure so as to urge the ejector to move in the mating direction to the inner position.

11. The pluggable module assembly as claimed in claim 9, wherein said driving portion and said resisting plate are discrete from each other, said driving portion being of insulative material while said resisting plate being of metallid material.

12. The pluggable module assembly as claimed in claim 11, wherein said ejector device is further equipped with a spring structure so as to urge the ejector to move in the mating direction to the inner position, said sprint structure being of metallic material and unitarily formed with said resisting plate.

13. The pluggable module assembly as claimed in claim 9, wherein said driving portion and said resisting plate are located on a same side with regard to the cable.

14. A pluggable module for use with a metallic mating receptacle cage with a deflectable retaining tab thereon, said pluggable module comprising:
   a housing for reception within the mating receptacle cage, defining a near end region and a far end region opposite to each other, said near end region comprising a latch portion for being retained in a locking aperture of the retaining tab;
   a mating port located around the far end region for mating with a corresponding electronic part on a mother board on which the mating receptacle cage is located;
   a cable extending out of the near end region and away the far end region;
   an ejector device located around the near end region and essentially back and forth moveable with regard to the housing in a mating direction between outer and inner positions and located at a similar level with regard to the latching portion, said ejector device including a resisting plate for pushing the deflectable retaining tab outwardly in a transverse direction perpendicular to said mating direction when the ejector device is moved backwardly in an un-mating direction opposite to mating direction, and a driving portion extending along said un-mating direction away from the near end region for finger holding so as to move said ejector device backwardly in said un-mating direction toward the outer position for unlatching the latch portion from the retaining tab.

15. The pluggable module assembly as claimed in claim 14, wherein said ejector device is further equipped with a spring structure so as to urge the ejector to move in the mating direction to the inner position.

16. The pluggable module assembly as claimed in claim 14, wherein said driving portion and said resisting plate are discrete from each other, said driving portion being of insulative material while said resisting plate being of metallid material.

17. The pluggable module assembly as claimed in claim 16, wherein said ejector device is further equipped with a spring structure so as to urge the ejector to move in the mating direction to the inner position, said sprint structure being of metallic material and unitarily formed with said resisting plate.

18. The pluggable module assembly as claimed in claim 14, wherein said driving portion and said resisting plate are located on a same side with regard to the cable.

* * * * *